United States Patent
Kim et al.

(10) Patent No.: US 12,027,723 B2
(45) Date of Patent: Jul. 2, 2024

(54) BATTERY MODULE INCLUDING THE CENTER WALL

(71) Applicant: SK On Co., Ltd., Seoul (KR)

(72) Inventors: Ho Yeon Kim, Daejeon (KR); Sang Tae An, Daejeon (KR); Hwa Kyoo Yoon, Daejeon (KR); Gang U Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/450,408

(22) Filed: Aug. 16, 2023

(65) Prior Publication Data

US 2024/0072372 A1 Feb. 29, 2024

(30) Foreign Application Priority Data

Aug. 30, 2022 (KR) .................. 10-2022-0109306

(51) Int. Cl.
| | |
|---|---|
| *H01M 50/367* | (2021.01) |
| *H01M 10/658* | (2014.01) |
| *H01M 50/224* | (2021.01) |
| *H01M 50/258* | (2021.01) |
| *H01M 50/271* | (2021.01) |
| *H01M 50/507* | (2021.01) |

(52) U.S. Cl.
CPC ....... *H01M 50/367* (2021.01); *H01M 10/658* (2015.04); *H01M 50/224* (2021.01); *H01M 50/258* (2021.01); *H01M 50/271* (2021.01); *H01M 50/507* (2021.01)

(58) Field of Classification Search
CPC .................................................. H01M 50/367
See application file for complete search history.

(56) References Cited

U.S. PATENT DOCUMENTS

| | | |
|---|---|---|
| 2021/0280937 A1 | 9/2021 | Rhee et al. |
| 2022/0059901 A1 | 2/2022 | Ren et al. |
| 2022/0115737 A1* | 4/2022 | Shin .................... H01M 10/658 |
| 2022/0123423 A1* | 4/2022 | Wang .................. H01M 50/262 |

(Continued)

FOREIGN PATENT DOCUMENTS

| | | | |
|---|---|---|---|
| CN | 110190211 A | 8/2019 | |
| CN | 112787020 A * | 5/2021 | .......... H01M 10/613 |

(Continued)

OTHER PUBLICATIONS

Extended European Search Report for the European Patent Application No. 23191472.2 issued by the European Patent Office on Feb. 15, 2024.

*Primary Examiner* — Basia A Ridley
*Assistant Examiner* — Heng M. Chan
(74) *Attorney, Agent, or Firm* — IP&T GROUP LLP

(57) ABSTRACT

A battery module includes: first and second sub-battery modules, respectively comprising a cell stack including a plurality of battery cells, and a bus bar assembly disposed at least one side of the cell stack; and a central wall disposed between the first and second sub-battery modules, wherein the central wall includes a hollow venting passage formed in a direction intersecting the direction that the first and second sub-battery modules are disposed such that gas or flames occurring in the first or second sub-battery modules are allowed to flow from inside the battery module through the hollow venting passage to the outside of the battery module.

14 Claims, 10 Drawing Sheets

(56) References Cited

U.S. PATENT DOCUMENTS

| | | | |
|---|---|---|---|
| 2022/0209332 A1 | 6/2022 | Jung et al. | |
| 2022/0255185 A1 | 8/2022 | Lee | |
| 2022/0263191 A1 | 8/2022 | Park | |
| 2022/0294048 A1* | 9/2022 | Zhu | H01M 50/289 |
| 2023/0327278 A1* | 10/2023 | Shin | H01M 50/249 |
| | | | 429/56 |

FOREIGN PATENT DOCUMENTS

| | | | |
|---|---|---|---|
| CN | 113594598 A | 11/2021 | |
| CN | 215153897 U | 12/2021 | |
| CN | 216928848 U | 7/2022 | |
| CN | 114914625 A | 8/2022 | |
| KR | 10-2021-0004189 A | 1/2021 | |
| KR | 10-2021-0044534 A | 4/2021 | |
| KR | 10-2021-0112645 A | 9/2021 | |
| WO | WO-2022270746 A1 * | 12/2022 | |

* cited by examiner

BATTERY MODULE INCLUDING THE CENTER WALL

CROSS-REFERENCE TO RELATED APPLICATION(S)

This application claims benefit of priority to Korean Patent Application No. 10-2022-0109306 filed on Aug. 30, 2022 in the Korean Intellectual Property Office, the disclosure of which is incorporated herein by reference in its entirety.

BACKGROUND

1. Field

The present disclosure relates to a battery module.

2. Description of Related Art

A secondary battery refers to a battery capable of repeating charging and discharging because mutual conversion between chemical energy and electrical energy is reversible.

Such a secondary battery may be used as an energy source for electric vehicles, hybrid vehicles, energy storage systems (ESSs), and the like, which have recently attracted attention, including mobile devices.

The secondary battery may be used in a form in which one or more battery cells formed of a flexible pouch-type battery cell or a prismatic or cylindrical can-type battery cell having rigidity are electrically connected, and in particular, in the case of an electric vehicle requiring high-output power characteristics, it may be used in a form of a battery module in which one or more cell stacks, in which a plurality of battery cells are stacked, are electrically connected or a battery pack in which one or more battery modules are electrically connected.

Meanwhile, a battery cell may be ignited due to a variety of event. Flames or high-temperature gas ejected from the battery cell may flow inside the battery module and be transferred to the neighboring other battery cells.

In particular, in the case that one or more battery modules are closely disposed and mounted such as in an electric vehicle, when a battery cell ignites, ejected flames or incandescent ash may flow and transfer heat to an adjacent battery module. In the case of the incandescent ash, due to a conductivity thereof, electrical short circuits may be caused among the components thereof, thereby accelerating heat transfer and thermal runaway.

SUMMARY

An aspect of the present disclosure is to provide a battery module capable of maintaining the structure thereof even when a battery cell ignites.

Another aspect of the present disclosure is to provide a battery module capable of delaying heat transfer by controlling a flame ejection direction.

According to an aspect of the present disclosure, a battery module may comprise: first and second sub-battery modules, respectively comprising a cell stack including a plurality of battery cells, and a bus bar assembly disposed at least one side of the cell stack; and a central wall disposed between the first and second sub-battery modules, wherein the central wall includes a hollow venting passage formed in a direction intersecting the direction that the first and second sub-battery modules are disposed such that gas or flames occurring in the first or second sub-battery modules are allowed to flow from inside the battery module through the hollow venting passage to the outside of the battery module.

A battery cell according to an aspect of the present disclosure can prevent a collapse due to flames ejected when a battery cell is ignited, thereby preventing deterioration of an event situation.

In addition, a battery cell according to an aspect of the present disclosure can control an ejection direction of high-temperature gas and flames and delay heat transfer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
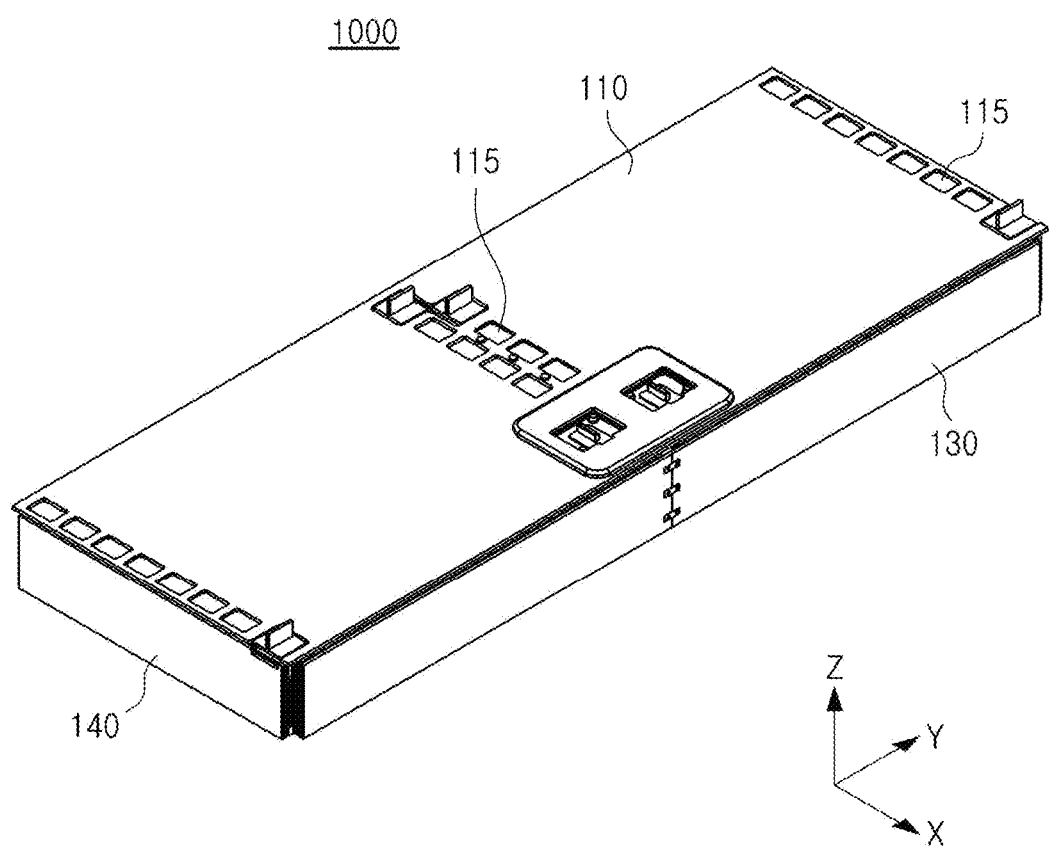
FIG. 1 is a perspective view of a battery module according to an embodiment of the present disclosure.

Prior to the detailed description of the present disclosure, the terms or words used in the present specification and claims described below should not be construed as being limited to a common or dictionary meaning, and the inventor intends to use his/her invention in the best manner possible. Based on the principle that terms may be properly defined for description, they should be interpreted as meanings and concepts consistent with the technical spirit of the present disclosure. Therefore, the embodiments described in this specification and the configurations shown in the drawings are only the embodiments of the present disclosure, and do not represent all of the technical spirit of the present disclosure, so it should be understood that there may be various equivalents and modifications that can be substituted therefor at the time of this application.

Hereinafter, preferred embodiments of the present disclosure will be described in detail with reference to the accompanying drawings. At this time, it should be noted that the same components in the accompanying drawings are indicated by the same reference numerals as much as possible. In addition, detailed descriptions of well-known functions and configurations that may obscure the gist of the present disclosure will be omitted below, and for the same reason, some components in the accompanying drawings are exaggerated, omitted, or schematically illustrated, and the size of each component does not entirely reflect the actual size thereof.

In the following description, singular expressions include plural expressions unless the context clearly dictates otherwise. The terms "include" or "comprise" are intended to indicate that there is a feature, number, step, operation, component, part, or combination thereof described in the specification, but it should be understood that the presence or addition of one or more other features or numbers, steps, operations, components, parts, or combinations thereof is not precluded.

In addition, in the following description, expressions such as "above," "upper," "below," "lower," "front," "rear," and the like, are expressed based on the directions illustrated in the drawings, and may be expressed differently if a direction of the object is changed.

In addition, terms including ordinal numbers such as "first" and "second" used herein may be used to describe various components, but the components are not limited by the terms, and the terms are used only for the purpose of distinguishing one component from another component. For example, without departing from the scope of the present invention, a first element may be termed a second element, and similarly, a second element may be termed a first element.

Figure 2:
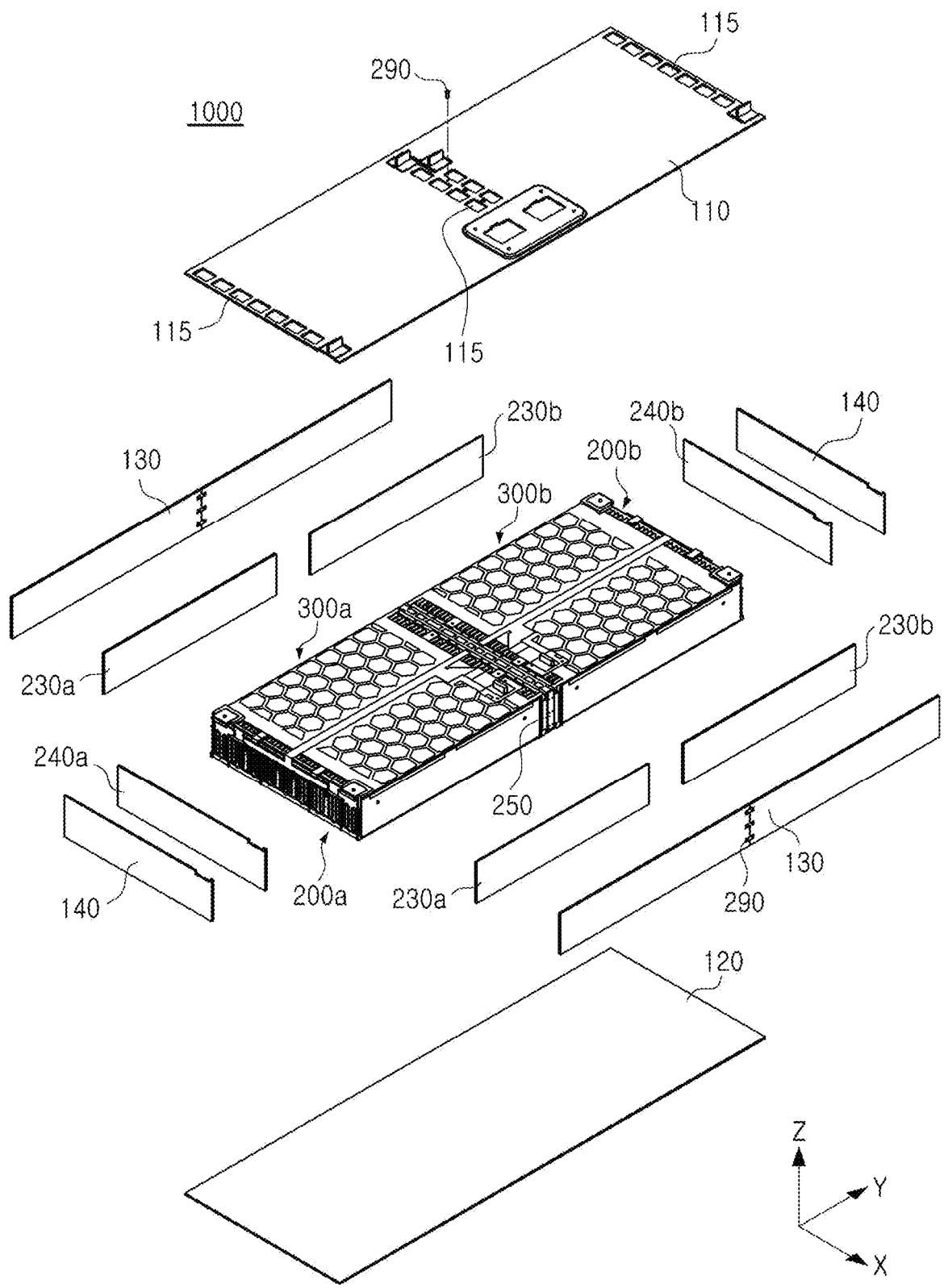
FIG. 2 is an exploded perspective view of the battery module of FIG. 1 according to an embodiment of the present disclosure.
Figure 3:
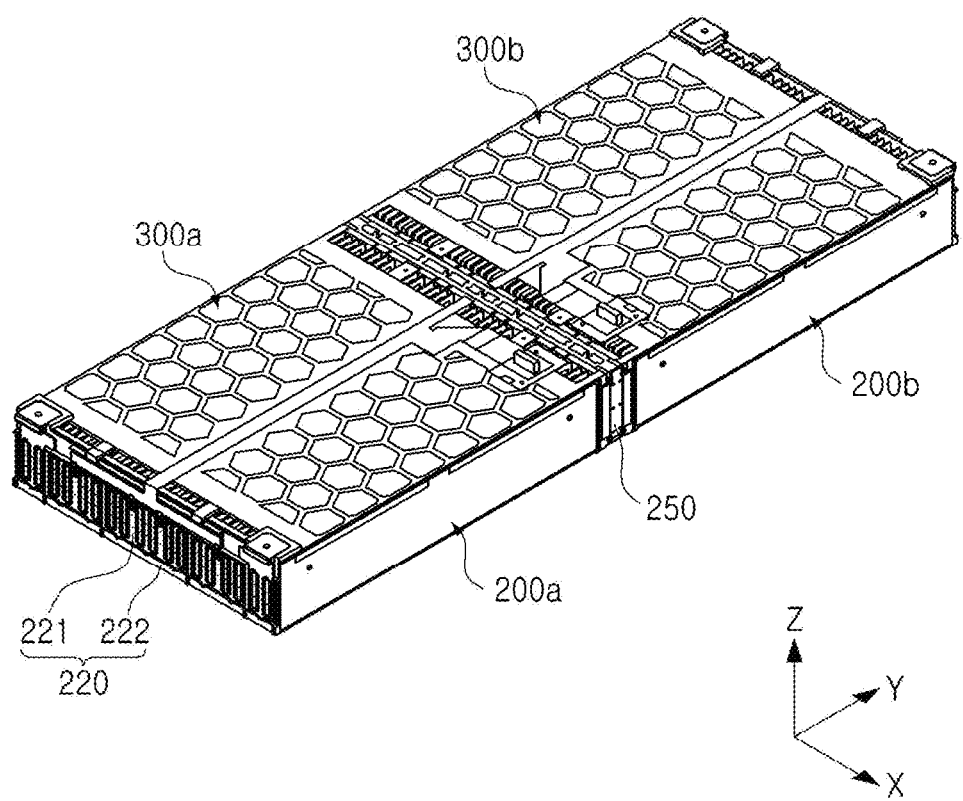
FIG. 3 is a perspective view of the first and second sub-battery modules of the battery module of FIG. 1.
Figure 4:
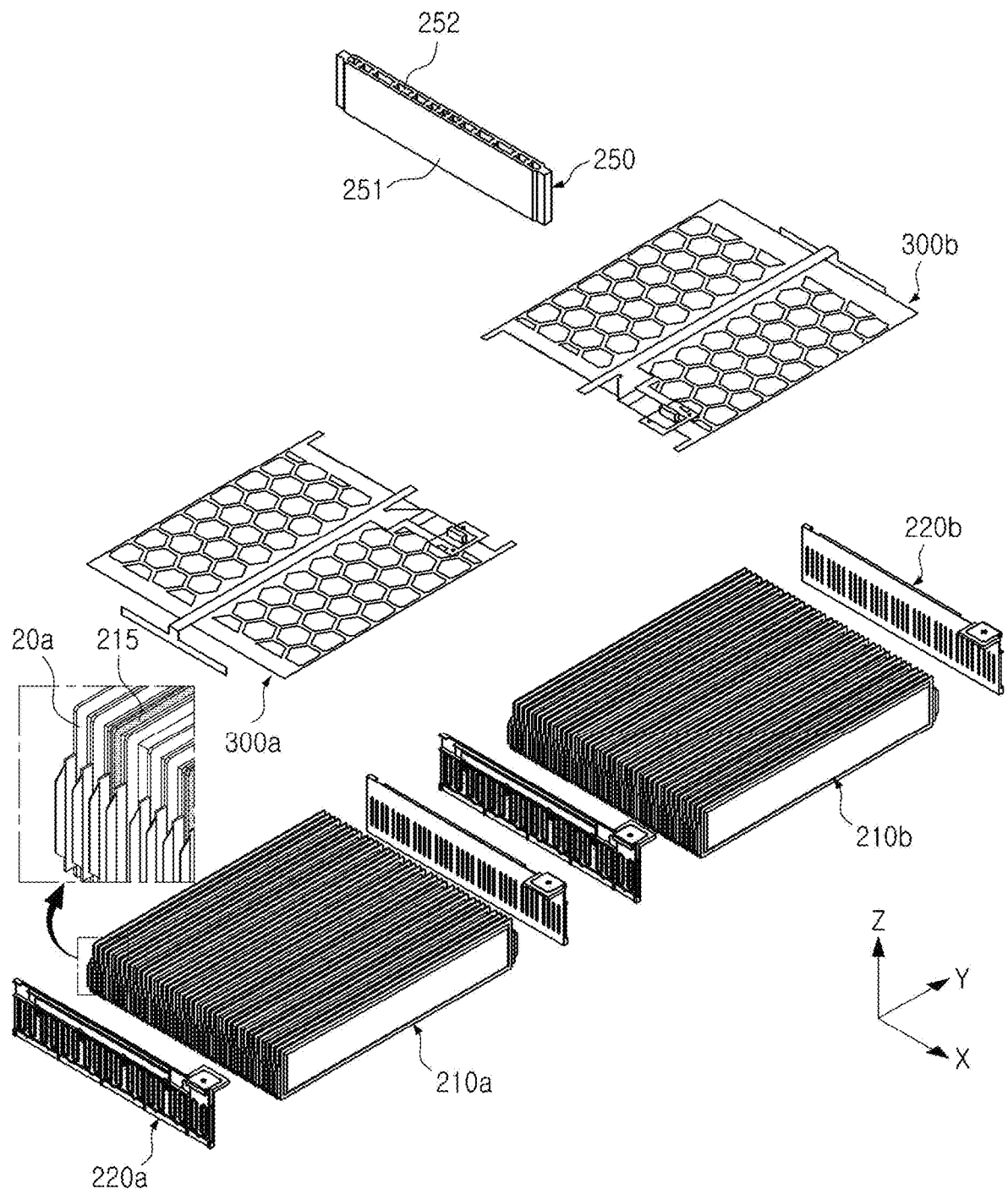
FIG. 4 is an exploded perspective view of the first and second sub-battery modules of FIG. 3.

FIG. 1 is a perspective view of a battery module according to an embodiment of the present disclosure, FIG. 2 is an exploded perspective view of a battery module according to an embodiment of the present disclosure, FIG. 3 is a perspective view of first and second sub-battery modules of the battery module of FIG. 1, and FIG. 4 is an exploded perspective view of the first and second sub-battery modules of FIG. 3.

According to an embodiment of the present disclosure, a battery module 1000 may include two sub-battery modules 200a and 200b. For example, the battery module 1000 may include a first sub-battery module 200a and a second sub-battery module 200b.

The first sub-battery module 200a and the second sub-battery module 200b may be arranged in a horizontal direction. Referring to FIG. 2, the first sub-battery module 200a and the second sub-battery module 200b may be arranged in a Y-direction (or a second direction).

According to an embodiment of the present disclosure, a central wall 250 may be disposed between the first sub-battery module 200a and the second sub-battery module 200b. That is, with reference to FIG. 2, the first sub-battery module 200a, the central wall 250 and the second sub-battery module 200b may be sequentially arranged in the Y-direction.

The first sub-battery module 200a and the second sub-battery module 200b may be spatially separated by the central wall 250. When an event occurs at the first sub-battery module 200a or the second sub-battery module 200b, the central wall 250 may delay or block heat transfer to the adjacent sub-battery module, i.e., the second sub-battery module 200b or the first sub-battery module 200a, respectively. The central wall 250 will be described in detail later.

Hereinafter, the numeral 200 may be used as a term inclusively to refer to the sub-battery modules 200a and 200b.

According to an embodiment of the present disclosure, each of the sub-battery modules 200 may include a cell stack 210 (210a, 210b), a bus bar assembly 220 (220a, 220b), an insulating pad 230 (230a, 230b), and an insulating cover 240 (240a, 240b). In addition, each of the sub-battery modules 200 may include a sensing assembly 300 (300a, 300b) disposed above the cell stack 210 (210a, 210b).

The cell stack 210 may include a plurality of battery cells 20 (20a, 20b) stacked in one direction. Referring to FIG. 4, the cell stack 210 may include a plurality of battery cells 20 stacked in an X-direction (or a first direction). The plurality of battery cells 20 may be electrically connected to each other in the cell stack 210.

The bus bar assembly 220 (220a, 220b) may be disposed on both sides of a longitudinal direction of the cell stack 210, and may be electrically connected to the plurality of battery cells 20. That is, the plurality of battery cells 20 may be electrically connected to each other via the bus bar assembly 220.

The bus bar assembly 220 may include a bus bar 221 electrically connecting the plurality of battery cells 20, and a bus bar frame 222 on which the bus bar 221 is disposed.

The bus bar 221 may be formed of a conductive material. The bus bar 221 may electrically connect neighboring two or more battery cells 20. For example, the battery cells 20 may include electrical leads drawn out in a longitudinal direction of the battery cells 20. Referring to FIG. 4, the battery cells 20 have lengths in a Y-direction, and the longitudinal direction of the battery cells 20 may indicate the Y-direction. Some of the electrode leads 21 drawn out in the longitudinal direction of the plurality of battery cells 20 may be inserted into the bus bar 221. Accordingly, the plurality of battery cells 20 may be electrically connected to the bus bar 221.

The bus bar frame 222 may support the bus bar 221. The bus bar frame 222 may be formed of an insulating material. For example, the bus bar frame 222 may be formed of a plastic material and may collapse as it is exposed to high-temperature gas and flames when an event occurs.

Each of the four side surfaces of the cell stack 210 may be covered by the insulating pad 230 (230a, 230b) and the insulating cover 240 (240a, 240b). Referring to FIG. 2, the insulating pad 230 may cover the side surfaces of the cell stack 210 in a stacking direction of the plurality of battery cells 20, i.e., the X-direction. In addition, the insulating cover 240 may cover the side surfaces of the cell stack 210 in the longitudinal direction of the plurality of battery cells 20, that is, in the Y-direction.

The insulating pad 230 and the insulating cover 240 may be formed of an insulating material, and may be disposed to cover the cell stack 210 in the X and Y-directions, respectively, so as to provide an electrical insulation between the cell stack 210 and a cover member to be described later, more specifically, a side cover 130 and an end cover 140 formed of an aluminum material.

The insulating pad 230 may also be disposed between the cell stacks 210. The insulating pads may be alternately stacked with the plurality of battery cells 20. For example, a pair of insulating pads may be disposed for every four battery cells 20. A pair of insulating pads may be disposed along with a heat insulating member for every four battery cells 20, and the insulating pads may be disposed on both sides of the heat insulating member. In the present specification, the heat insulating member disposed between the pair of insulating pads may be a third heat insulating member 215, which will be described in detail later.

The sensing assembly 300 (300a, 300b) may be disposed above the cell stack 210. The sensing assembly 300 may be configured to sense information of voltages, temperatures, etc. of the plurality of battery cells 20 constituting the sub-battery module 200.

For example, the sensing assembly 300 may be connected to the bus bar assembly 220 and a temperature sensor to sense voltage and temperature information of the plurality of battery cells 20. The sensed voltage and temperature information of the plurality of battery cells 20 may be transmitted to a cell monitoring unit (CMU) 340 (340a, 340b).

Meanwhile, according to an embodiment of the present disclosure, the battery module 100 may include cover members configured to cover the first sub-battery module 200a and the second sub-battery module 200b. The cover members disposed on an outmost side of the battery module 1000 may be formed of a metal material, for example a material containing aluminum.

The battery module 100 may include an upper cover 110 configured to cover upper portions of the first sub-battery module 200a and the second sub-battery module 200b, a lower cover 120 configured to cover lower portions of the first sub-battery module 200a and the second sub-battery module 200b, and side covers 130 and end covers 140 configured to cover the side surfaces of the first sub-battery module 200a and the second sub-battery module 200b from different directions.

The upper cover 110 and the lower cover 120 may cover the first sub-battery module 200a and the second sub-battery module 200b all together at the upper portions and the lower portions of the first sub-battery module 200a and the second sub-battery module 200b, respectively. In addition, the central wall 250 disposed between the first sub-battery module 200a and the second sub-battery module 200b may also be covered with the upper cover 110 and the lower cover 120.

The side covers 130 may cover the side surfaces of the first sub-battery module 200a and the second sub-battery module 200b in the X-direction. Since the insulating pad 230 is disposed on outer portions of the first sub-battery module 200a and the second sub-battery module 200b in the Y-direction, the side covers 130 may be a configuration disposed to cover the insulating pad 230. The side covers 130 may cover the first sub-battery module 200a and the second sub-battery module 200b all together in the Y-direction.

The end cover 140 may cover the side surfaces of the first sub-battery module 200a and the second sub-battery module 200b in the Y-direction. Since the insulating cover 240 is disposed on outer portions of the first sub-battery module 200a and the second sub-battery module 200b in the Y-direction, the end covers 140 may be a configuration disposed to cover the insulating cover 240. The end covers 140 may cover the first sub-battery module 200a on one side in the Y-direction, and cover the second sub-battery module 200b on the other side in the Y-direction.

In addition, according to an embodiment of the present disclosure, the upper cover 110 may optionally include a venting hole 115 configured to eject gas generated when the battery cell 20 ignites. The upper cover 110 may include a plurality of the venting holes 115 as illustrated in the described embodiment of FIG. 1. The description therefore will be provided later.

Figure 5A:
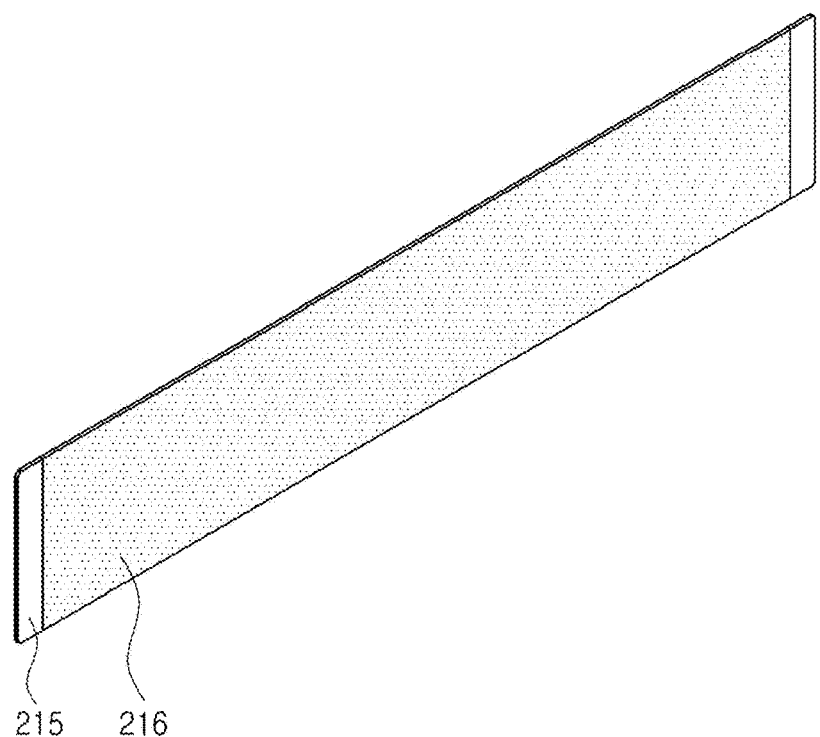
FIGS. 5A and 5B are a perspective view and a side view of a third heat insulating member, respectively.
Figure 5B:
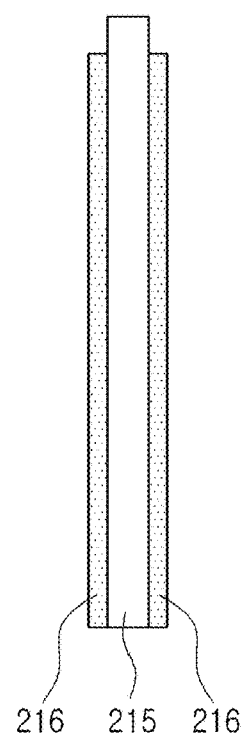
Figure 6:
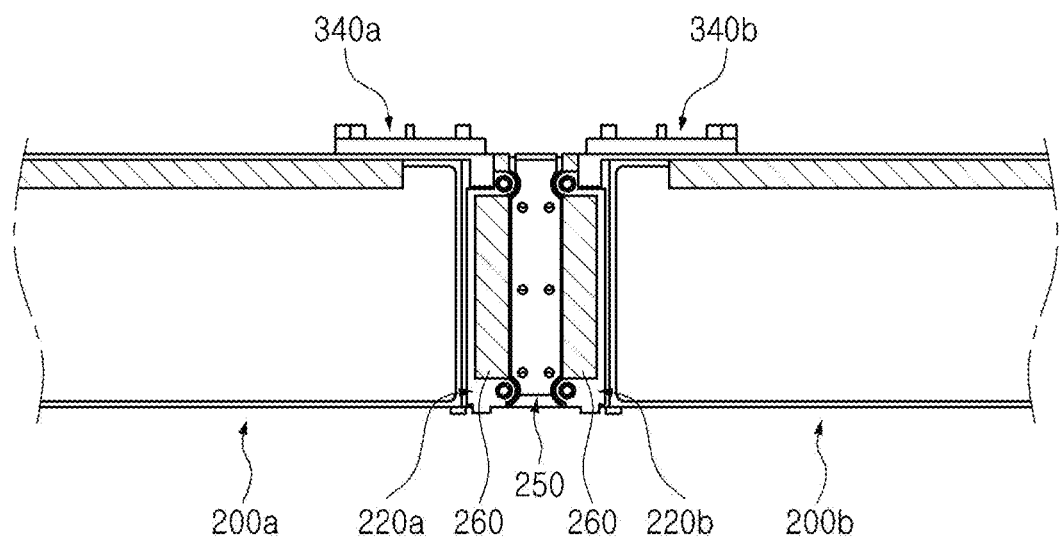
FIG. 6 a side view of a central wall of a battery module according to an embodiment of the present disclosure.
Figure 7:
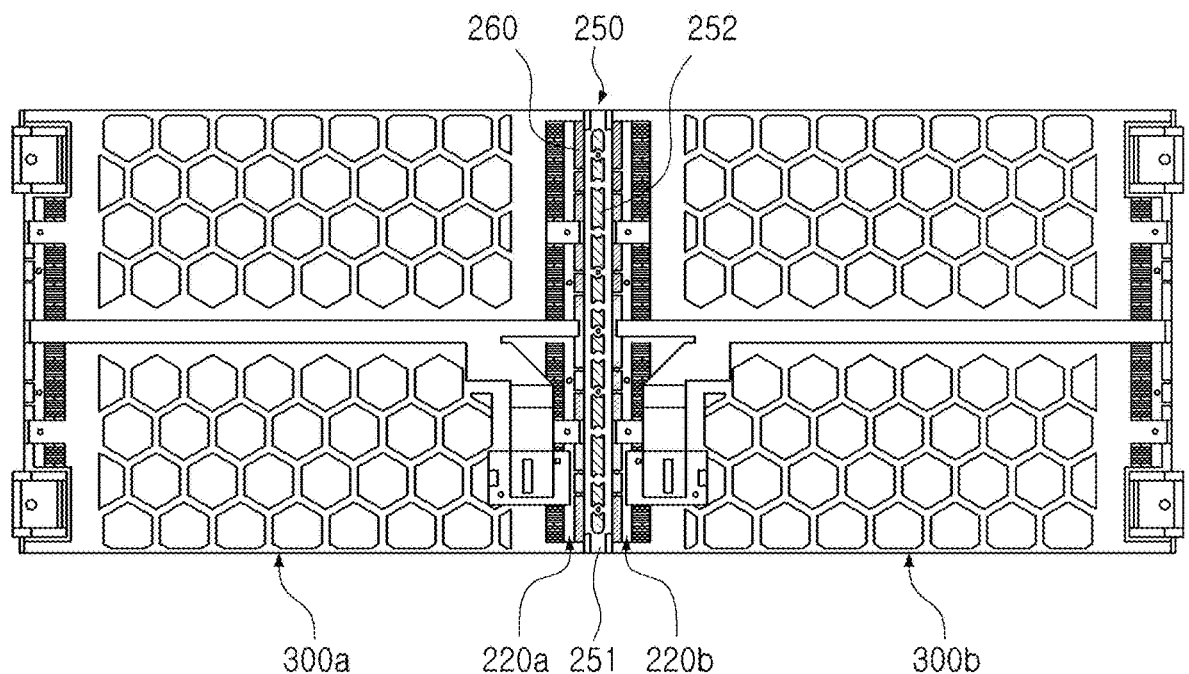
FIG. 7 a top view of a battery module according to an embodiment of the present disclosure.
Figure 8:
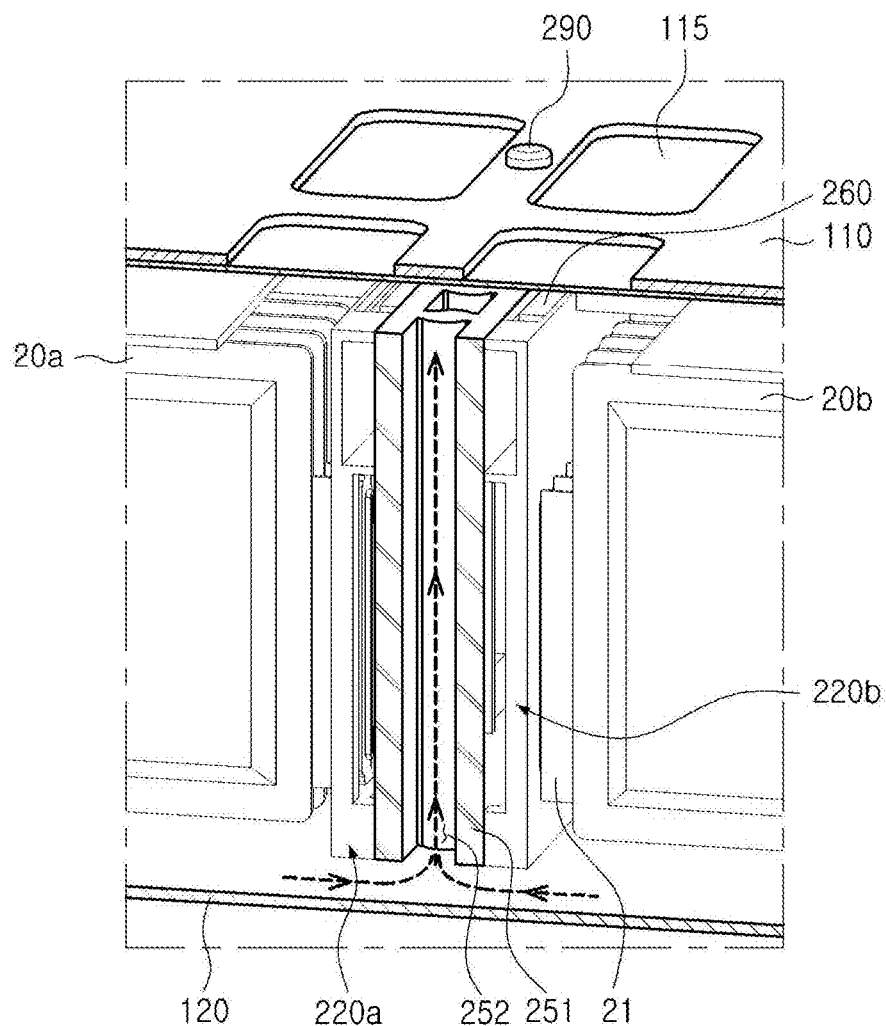
FIGS. 8 and 9 are cross-sectional views of a central wall of a battery module according to an embodiment of the present disclosure.
Figure 9:
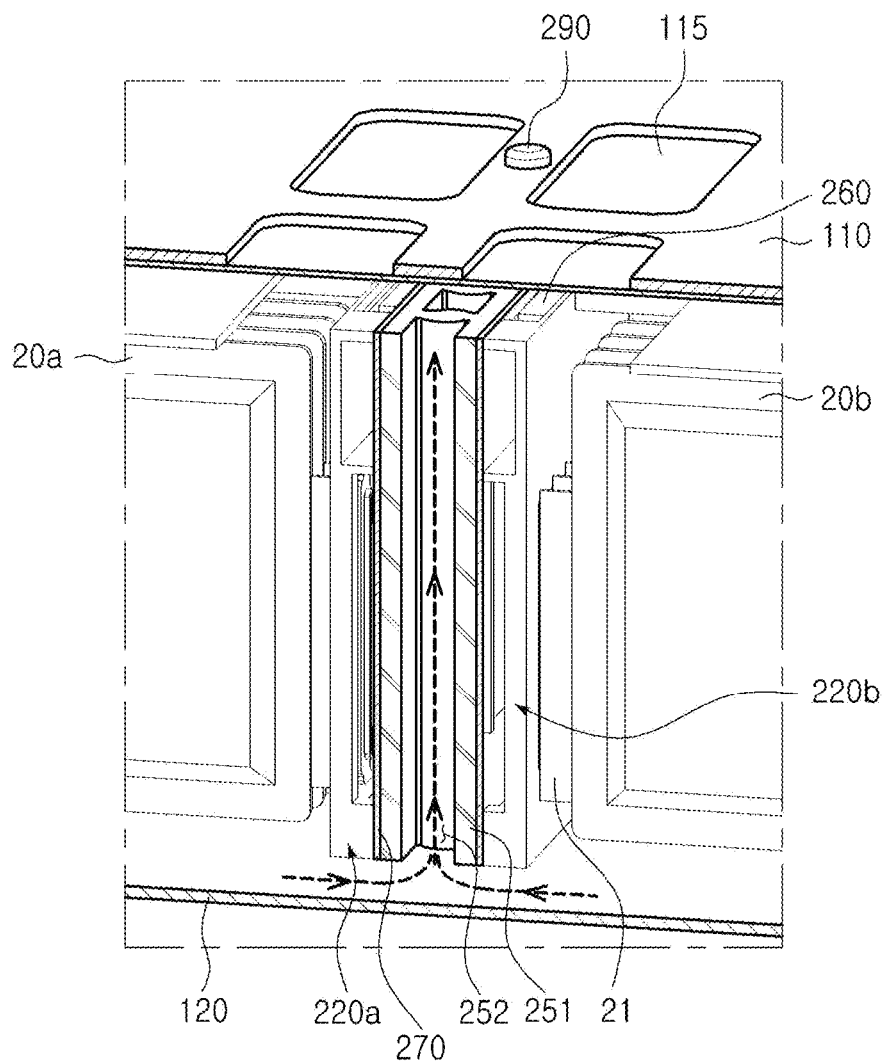
Figure 10:
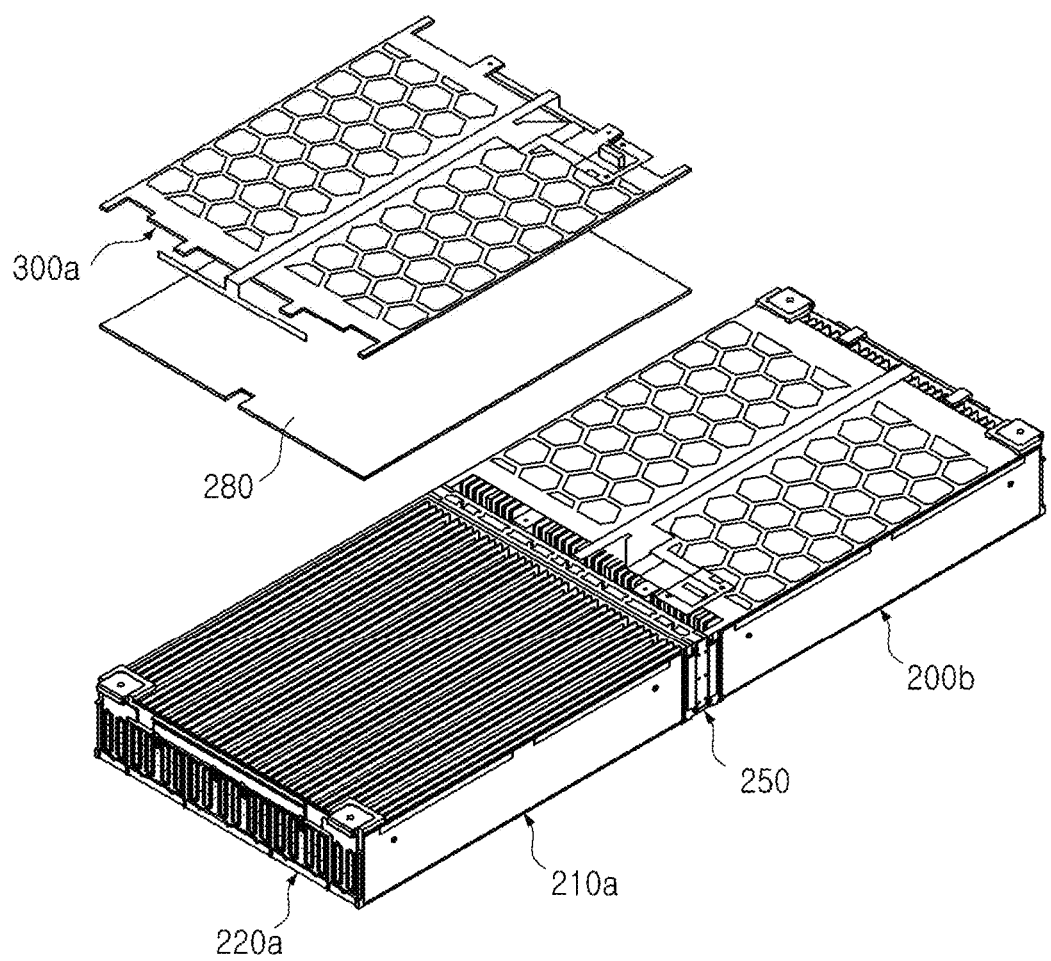
FIGS. 10 and 11 illustrate battery modules according to various embodiments of the present disclosure.
Figure 11:
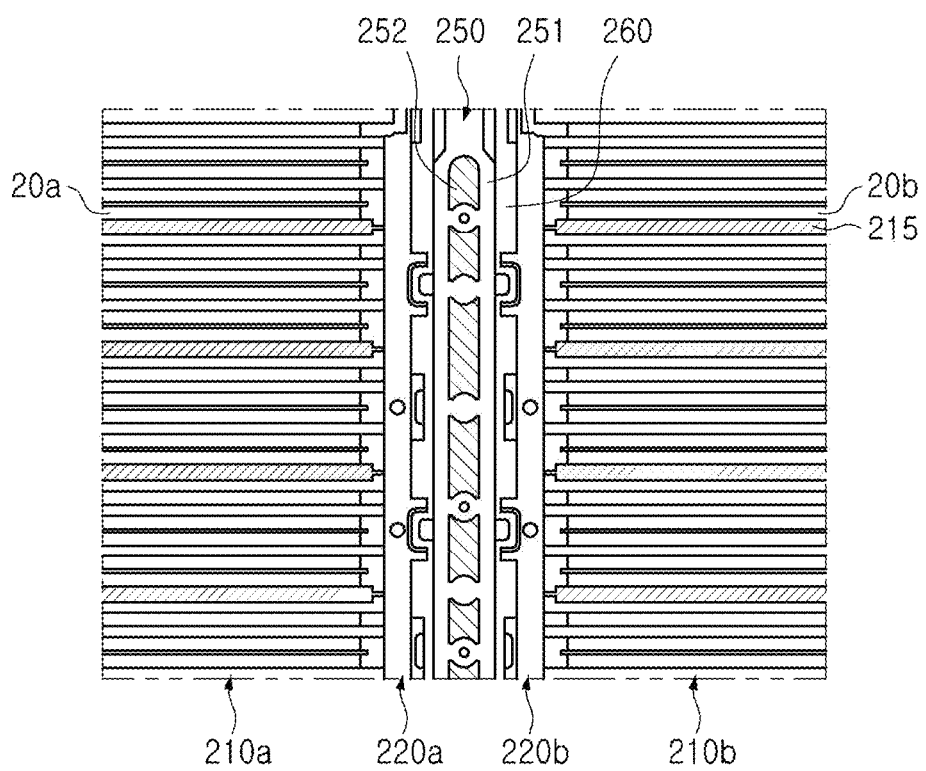

FIGS. 5A and 5B are a perspective view and a side view of the third heat insulating member, FIG. 6 is a side view of a central wall of a battery module according to an embodiment of the present disclosure, FIG. 7 is a top view of a battery module according to an embodiment of the present disclosure, FIGS. 8 and 9 are cross-sectional views of a central wall of a battery module according to an embodiment of the present disclosure, and FIGS. 10 and 11 illustrate battery modules according to various embodiments of the present disclosure.

According to an embodiment of the present disclosure, the battery module 1000 may include a central wall 250. The central wall 250 may be disposed between the first sub-battery module 200a and the second sub-battery module 200b.

Referring to the drawings, the central wall 250 may be disposed between the first sub-battery module 200a and the second sub-battery module 200b in the Y-direction. Since the bus bar assemblies 220 are disposed on both sides of the first sub-battery module 200a and the second sub-battery module 200b in the Y-direction, the central wall 250 may be disposed between the bus bar assemblies 220 (220a, 220b) of the first sub-battery module 200a and the second sub-battery module 200b.

More specifically, insulating covers 260 may be disposed between the central wall 250 and the first sub-battery module 200a, and between the central wall 250 and the second sub-battery module 200b. Both of the central wall 250 and the bus bars 221 of the bus bar assemblies 220 are formed of a conductive material. If the bus bar assemblies 220 directly face the central wall 250, an electrical short circuit may be caused when an impact or event occurs. Accordingly, the insulating covers 260 may be disposed between the bus bar assemblies 220 and the central wall 250. For example, the insulating covers 260 may be formed of a plastic material.

The central wall 260 may be coupled to the cover members disposed on outmost portions of the battery module 1000. For example, the central wall 250 may be coupled to the upper cover 110, the lower cover 120 and the side covers 130 via bolt members 290.

The central wall 250 may extend in the stacking direction of the plurality of battery cells 20, i.e., in the X-direction. In addition, the central wall 250 may have a height approximately the same as the battery module 1000. In the drawings, the height means a length in a Z-direction (or a third direction).

Since the central wall 250 having the shape as shown above is disposed between the first sub-battery module 200a and the second sub-battery module 200b, the first sub-battery module 200a and the second sub-battery module 200b may not directly face each other in the Y-direction, and may be spatially separated by the central wall 250.

High-temperature gas, flame, etc. generated when any one of the battery cells 20 in the battery module 1000 ignites may move and be transferred to the neighboring battery cell 20 in the battery module 1000. In addition, during this process, electrical short circuits may be caused among the components thereof due to incandescent ash having a conductivity, and a thermal runaway phenomenon may be accelerated.

The battery module 1000 according to an embodiment of the present disclosure may delay and prevent heat transfer between the neighboring sub-battery modules 200, by including the central wall 250 disposed between the first sub-battery module 200a and the second sub-battery module 200b.

According to an embodiment of the present disclosure, the central wall 250 may be formed of a material having excellent heat resistance, so as to prevent heat transfer between the neighboring sub-battery modules 200 when an event occurs.

That is, according to an embodiment of the present disclosure, since the central wall 250 of a material having excellent heat resistance is disposed between the first sub-battery module 200a and the second sub-battery module 200b, even though an event may occur at the first sub-battery module 200a (or the second sub-battery module 200b), it is possible to delay or completely prevent transfer of the event to the adjacent second sub-battery module 200b (or first sub-battery module 200a).

In addition, the battery module 1000 inner pressure may increase due to gas generated from the battery cell 20 when an event occurs. Hence, the central wall 260 may be formed of a material capable of enduring even a high-pressure environment.

According to an embodiment of the present disclosure, the central wall 250 may be formed of a material that does not easily burn even under high temperature conditions, may maintain its structure even when exposed to high-temperature gas and flames, and may not structurally collapse even in a high-pressure environment.

For example, the central wall 250 may include a frame 251 forming a structure, and the frame 251 may be formed of an aluminum-based or stainless-based material. Since the central wall 250 is formed of the above material, the structure can be maintained even at a temperature of about 600 degrees Celsius or more and a pressure of 3 bars or more.

As another example, the frame 251 of the central wall 250 may be formed of an aluminum-based material, and a surface of the frame 251 may further include a protective layer formed by anodizing. In this embodiment, the protective layer may be an oxide film layer ($Al_2O_3$ layer). Since the oxide film layer on the surface of the frame 251 is melted at a temperature of 2000 degrees Celsius or more, it is not structurally collapsed due to the ignition of the battery cell 20, whereby heat transfer between the sub-battery modules 200 can be effectively prevented. In addition, it is excellent in electrical insulation, whereby it is possible to prevent an electrical short circuit.

However, a material of the central wall 250 is not limited to the materials mentioned above, and may be replaced with any other material capable of maintaining the structure in high-temperature and high-pressure environments.

According to an embodiment of the present disclosure, the central wall 250 may include a venting passage 252 to allow gas or flames generated when an event occurs to flow. A plurality of venting passages 252 may be provided along the stacking direction (the X-direction) of the plurality of battery cells 20.

The venting passage 252 may have a hollow structure penetrating the frame 251 in a height direction thereof (the Z-direction). The venting passage 252 may be formed to penetrate the central wall 250 in a direction intersecting the direction in which the first sub-battery module 200a and the second sub-battery module 200b are arranged.

Therefore, when an event occurs, the gas generated in the first sub-battery module 200a or the second sub-battery module 200b is introduced into the venting passage 252 and flows in the height direction within the venting passage 252, and, thus, may not flow in a direction in which the first sub-battery module 200a and the second sub-battery module 200b face each other. Accordingly, heat transfer between the adjacent sub-battery modules 200 may be prevented.

When an event occurs in the first sub-battery module 200a or the second sub-battery module 200b, a portion of gas, flames, etc. may be introduced into the venting passage 252 by flowing from the first sub-battery module 200a or the second sub-battery module 200b toward the central wall 250.

At this time, a fine gap (hereinafter, referred to as 'a groove') may be formed between the central wall 250 and the first sub-battery module 200a or the second sub-battery module 200b, such that gas, etc., can be introduced into the venting passage 252. For example, the groove may be formed on a lower side of the battery module 1000 with reference to the drawings, and may be continuously or discontinuously formed along the stacking direction of the plurality of battery cells 20.

The groove may be formed in various shapes, and, for example, may be formed in a mesh shape. In this case, gas, etc. may pass through the groove, while incandescent ash may not pass through the groove. Accordingly, it is possible to prevent an electrical short circuit due to the flow or scattering of the incandescent ash having a conductivity within the sub-battery module 200.

A portion of the gas, flames, etc. formed as an event occurs in the first sub-battery module 200a or the second sub-battery module 200b may flow from the first sub-battery module 200a or the second sub-battery module 200b toward the central wall 250 along the fine gap.

The gas, flames, etc. flowing toward the central wall 250 may be introduced into the venting passage 252. Since the venting passage 252 is formed in the height direction, the gas, flames, etc. may flow in the height direction within the venting passage 252 when an event occurs.

Since the venting passage 252 is formed to pass through the frame 251 in the height direction, the gas, etc. introduced into the venting passage 252 may collide with the frame 251 exposed in the venting passage 252 so that a flow direction can be controlled to the height direction. That is, the venting passage 252 may not only provide a path through which the gas generated by ignition, etc. flows, but also control a flow direction of the gas.

In addition, a cooling passage may be provided between the lower cover 120, and the first sub-battery module 200a and the second sub-battery module 200b, whereby the portions of the sub-battery modules 200 may have a relatively lower temperature in the sub-battery modules 200. Accordingly, a flow of high-temperature gas in the venting passage 252 may be formed from the lower cover 120 toward the upper cover 110 in the height direction.

In the battery module 1000 according to an embodiment of the present disclosure, high-temperature gas, flames, etc. generated in an event situation of the first sub-battery module 200a or the second sub-battery module 200b may be introduced into the venting passage 252 formed on the central wall 250, and may not be transferred to the adjacent sub-battery module 200.

Meanwhile, according to an embodiment of the present disclosure, a first heat insulating member 270 may be further included between the first sub-battery module 200a and the central wall 250 and between the second sub-battery module 200b and the central wall 250, as shown in FIG. 9. More specifically, a first heat insulating member 270 may be further included between the central wall 250 and the insulating covers 260 on the sides of the first sub-battery module 200a and the second sub-battery module 200b.

For example, the first heat insulating member 270 may be a sheet extending in the stacking direction of the battery cells 20. In addition, the first heat insulating member 270 may be formed of a material such as mica, ceramic wool, aerogel, etc. That is, the first heat insulating member 270 may be formed of a material having an insulating property and a heat insulating property.

The battery module 1000 according to an embodiment of the present disclosure may more securely block heat transfer between the adjacent first sub-battery module 200a and second sub-battery module 200b by providing the first heat insulating member 270.

According to another embodiment of the present disclosure, in addition to or instead of the first heat insulating member 270, a flame protection member may be further provided between the first sub-battery module 200a and the central wall 250 and between the second sub-battery module 200b and the central wall 250. For example, the flame protection member may melt in an environment of 100 degrees Celsius or more, and serve to block oxygen and extinguish flames. The flame protection member may prevent deterioration of event conditions and heat transfer.

Meanwhile, the battery module 1000 according to an embodiment of the present disclosure may further include a heat insulating member for preventing heat transfer between the adjacent sub-battery modules 200 and heat transfer in the sub-battery module 200.

As an embodiment, referring to FIG. 10, the battery module 1000 according to an embodiment of the present disclosure may further include a second heat insulating member 280 between the cell stack 210a and the upper cover 110. In FIG. 9, it is shown that the second insulating member 280 is provided on a side of the first sub-battery module 200a, but may be provided between the cell stack 210b and the upper cover 110 of the second sub-battery modules 200b.

The second heat insulating member 280 may cover the cell stack 210 from an upper side of the cell stack 210. For example, the second heat insulating member 280 may be formed to have a length greater than lengths in the stacking direction and the longitudinal direction of the battery cells 20 constituting the cell stack 210.

The second heat insulating member 280 may prevent incandescent ash generated by ignition of the battery cell 20 from scattering upward. The second heat insulating member 280 may prevent thermal runaway phenomenon and prevent gas from flowing through an unintended path. Similar to the first heat insulating member 270, the second heat insulating member 280 may be formed of a material having an insulating property and a heat insulating property, for example, a material such as mica, ceramic wool, or aerogel, but is not limited thereto.

In addition, referring to FIG. 11 as another embodiment, a third heat insulating member 215 may be further included between the plurality of battery cells 20a in the first sub-battery module 200a and the plurality of battery cells 20b in the second sub-battery module 200b.

The third insulating member 215 may be disposed between the plurality of battery cells 20 so as to prevent heat transfer within the sub-battery modules 200. The third insulating member 215 may be a sheet extending in the longitudinal direction of the battery cells 20 and may be disposed in a certain number of battery cells 20. In an embodiment, the third insulating member 215 may be disposed every four battery cells 20.

Furthermore, referring to FIGS. 5A and 5B, a pair of insulating pads 216 may be disposed on both sides of the third heat insulating member 215. The insulating pads 216 may be applied to both surfaces of the third heat insulating member 215 (See FIG. 5B) in the form of a sandwich panel and disposed between the plurality of battery cells 20 so as to prevent the plurality of battery cells 20 from swelling.

The third heat insulating member 215 may be formed of a material having an insulating property and a heat insulating property, for example, a mica material.

A venting hole 115 may be formed in the upper cover 110 of the battery module 1000 according to an embodiment of the present disclosure. High-temperature gas or flames generated inside the battery module 1000 may be discharged to the outside of the battery module 1000 through the venting hole 115.

A plurality of the venting holes 115 may be formed in the upper cover 110. The plurality of venting holes 115 may be provided in the stacking direction of the battery cells 20 on the upper cover 110 to form one row. The upper cover 110 may include one or more rows formed by the venting holes 115.

As an example, a row of spaced apart venting holes 115 may be provided on an upper portion of the central wall 250. The upper cover 110 may include the row of the venting holes 115 at a portion overlapping the central wall 250 in the Z-direction. In this case, gas and flames flowing in the venting passage 252 may be ejected to the outside through the venting holes 115 formed on the upper cover 110.

As another example, multiple rows formed by the venting holes 115 may be provided on upper portions of the bus bar assemblies 220 of the first sub-battery module 200a and the second sub-battery module 200b. That is, the upper cover 110 may include the rows formed by the venting holes 115 at a portion overlapping the bus bar assemblies 220 in the Z-direction, and may include, for example, four rows spaced apart in the Y-direction. In this case, gas and flames flowing from the first sub-battery module 200a or the second sub-battery module 200b may be discharged through the venting holes 115.

Meanwhile, the accompanying drawings show that the number of the venting holes 115 formed on the side of the first sub-battery module 200a is different from the number of the venting holes 115 formed on the side of the second sub-battery module 200b. However, this is only an example, and the same numbers of the venting holes 115 may be formed on both sides in accordance with a modification of terminal formation positions.

According to an embodiment of the present disclosure, the venting hole 115 may be formed of a material different from that of the upper cover 110. Specifically, the venting hole 115 may be provided with a material and shape that can be easily melted or broken at high temperature or high pressure so that gas, etc. inside the battery module 1000 can be smoothly discharged to the outside.

For example, the venting hole 115 may be formed of a material with a lower melting point than that of the upper cover 110. The upper cover 110 may be formed of a material having excellent heat resistance that does not melt easily at high temperatures in order to maintain the structure of the battery module 1000 even when ignited, and as described above, may be formed of aluminum. In contrast, the venting hole 115 may be formed of a material that can be melted in an event situation, for example, a plastic material. Furthermore, the venting hole 115 may be formed to have a thickness less than those of other portions of the upper cover 110, and may be provided in the form of a plastic sheet. However, this is only one of several examples that can implement the venting hole 115, and it goes without saying that the venting hole 115 can be implemented in other forms.

As described above, the battery module 1000 according to an embodiment of the present disclosure may prevent collapse due to flames ejected when the battery cell 20 ignites, and improve the structural stability of the battery module 1000 at high temperatures. In addition, heat transfer can be delayed by controlling the ejection direction of gas and flames.

While example embodiments have been shown and described above, it will be apparent to those skilled in the art that modifications and variations could be made without departing from the scope of the present invention as defined by the appended claims.

What is claimed is:

1. A battery module, comprising:
   first and second sub-battery modules, respectively comprising a cell stack including a plurality of battery cells, and a bus bar assembly disposed at least one side of the cell stack; and
   a central wall disposed between the first and second sub-battery modules,
   wherein the plurality of battery cells is stacked in a first direction, the first and second sub-battery modules are disposed in a second direction intersecting the first direction,
   wherein the central wall includes a hollow venting passage formed in a third direction intersecting the first direction and the second direction such that gas or flames occurring in the first or second sub-battery modules are allowed to flow from inside the battery module through the hollow venting passage to the outside of the battery module,
   wherein the central wall includes a frame extending in the first direction, and
   wherein the hollow venting passage is formed to penetrate the frame such that the ends of the hollow venting passage oppose each other in the third direction.

2. The battery module according to claim 1, wherein the frame is formed of a material having a melting point of 600 degrees Celsius or more and is capable of enduring a pressure of 3 bars or more.

3. The battery module according to claim 2, wherein the central wall further includes a protection member on a surface of the frame, and
   wherein the protection member having a melting point greater than that of the frame.

4. The battery module according to claim 1, wherein a plurality of the hollow venting passages is disposed in the first direction.

5. The battery module according to claim 1, further comprising a cover member covering the first and second sub-battery modules and the central wall, and
   wherein the central wall is coupled to the cover member.

6. The battery module according to claim 1, further comprising an insulating cover disposed between one surface of the first and second sub-battery modules and one surface of the central wall facing each other at least in the second direction.

7. The battery module according to claim 6, further comprising a heat insulating member disposed between the insulating cover and the central wall.

8. The battery module according to claim 1, further comprising a heat insulating member disposed to cover an upper portion of the cell stack.

9. The battery module according to claim 1, further comprising heat insulating members disposed at a predetermined interval between the plurality of battery cells in the first direction.

10. The battery module according to claim 5, wherein the cover member includes an upper cover disposed on upper sides of the first and second sub-battery modules and the central wall, and
    wherein the upper cover includes one or more venting holes formed along the first direction.

11. The battery module according to claim 10, wherein the venting holes are disposed to overlap at least one of the central wall and the bus bar assembly in the third direction.

12. A battery module, comprising:
    first and second sub-battery modules spatially separated to each other by a central wall disposed therebetween,
    a hollow venting passage formed inside the central wall configured to vent gas or flames occurring in any of a plurality of battery cells stacked inside the first or second sub-battery modules outside of the battery module,
    wherein the plurality of battery cells is stacked in a first direction, the first and second sub-battery modules are disposed in a second direction intersecting the first direction, and the hollow venting passage is formed in a third direction intersecting the first direction and the second direction,
    wherein the central wall includes a frame extending in the first direction, and
    wherein the hollow venting passage is formed to penetrate the frame such that the ends of the hollow venting passage oppose each other in the third direction.

13. The battery module according to claim 12, further comprising an upper cover disposed on upper sides of the first and second sub-battery modules and the central wall and coupled to the center wall, and
    wherein the upper cover includes one or more venting holes.

14. The battery module according to claim 13, wherein the one or more venting holes are formed at a portion of the upper cover overlapping the center wall.

* * * * *